United States Patent
Favaretto

(10) Patent No.: US 8,386,106 B2
(45) Date of Patent: Feb. 26, 2013

(54) STARTING METHOD OF A THERMAL ENGINE OF A VEHICLE WITH HYBRID PROPULSION

(75) Inventor: Fabrizio Favaretto, Formigine (IT)

(73) Assignee: Ferrari S.p.A. (IT)

( * ) Notice: Subject to any disclaimer, the term of this patent is extended or adjusted under 35 U.S.C. 154(b) by 358 days.

(21) Appl. No.: 12/875,739

(22) Filed: Sep. 3, 2010

(65) Prior Publication Data

US 2011/0082609 A1    Apr. 7, 2011

(30) Foreign Application Priority Data

Sep. 3, 2009   (IT) .............................. BO2009A0567

(51) Int. Cl.
*B60W 20/00* (2006.01)
*B60W 10/02* (2006.01)
*B60L 15/20* (2006.01)

(52) U.S. Cl. ................. 701/22; 123/179.28; 180/65.265

(58) Field of Classification Search .................... 701/22; 123/179.28; 180/65.265, 65.21, 65.25, 65.7; 477/7, 8, 167; 475/5; 903/902, 906, 909, 903/910, 914, 916, 918, 945, 946; 74/339, 74/340; 290/46; 324/378, 401

See application file for complete search history.

(56) References Cited

U.S. PATENT DOCUMENTS

| 5,337,848 | A | 8/1994 | Bader |
| 6,354,974 | B1 | 3/2002 | Kozarekar |
| 7,383,902 | B2 * | 6/2008 | Matsuzaki et al. ........ 180/65.285 |
| RE41,034 | E * | 12/2009 | Lilley et al. ................. 290/40 C |
| 2002/0088291 | A1 | 7/2002 | Bowen |
| 2002/0117860 | A1 | 8/2002 | Man et al. |
| 2005/0139035 | A1 | 6/2005 | Lee et al. |
| 2005/0155803 | A1 | 7/2005 | Schiele |
| 2009/0017988 | A1 | 1/2009 | Reuschel |

FOREIGN PATENT DOCUMENTS

| DE | 10305639 A1 | 3/2004 |
| DE | 102007050659 A1 | 4/2009 |
| GB | 2335404 A | 9/1999 |
| WO | WO-2007/131838 A1 | 11/2007 |

* cited by examiner

*Primary Examiner* — Thomas Black
*Assistant Examiner* — Marthe Marc-Coleman
(74) *Attorney, Agent, or Firm* — Schwegman Lundberg & Woessner, P.A.

(57) ABSTRACT

A starting method of an internal combustion thermal engine of a vehicle with hybrid propulsion provided with a transmission equipped with a twin-clutch gearbox and a reversible electric machine connected to a first primary shaft; the starting method including the steps of: making the electric machine work as an engine for producing a torque; partially closing a first clutch connected to the first primary shaft in order to make the first clutch itself slip to transmit part of the torque generated by the electric machine to a drive shaft of the thermal engine; engaging a gear coupled to a second primary shaft to mechanically connect the second primary shaft itself to the driving wheels; and closing partially a second clutch connected to the second primary shaft in order to make the second clutch itself slip and transmit part of the torque generated by the electric machine to the driving wheels.

12 Claims, 3 Drawing Sheets

STARTING METHOD OF A THERMAL ENGINE OF A VEHICLE WITH HYBRID PROPULSION

RELATED APPLICATIONS

This application claims priority, under 35 U.S.C. Section 119, to Italian Patent Application Serial No. B02009A 000567 filed on Sep. 3, 2009, which is incorporated herein by reference in its entirety.

TECHNICAL FIELD

The document relates to a starting method of a thermal engine of a vehicle with hybrid propulsion.

BACKGROUND

A vehicle with hybrid propulsion comprises an internal combustion thermal engine, which transmits torque to the driving wheels by means of a transmission provided with a gearbox, and at least one electric machine, which is electrically connected to an electric accumulation system and mechanically connected to the driving wheels.

The following modes are possible while traveling: either a thermal operating mode, in which the torque is generated only by the thermal engine, and the electric machine may work as generator for recharging the accumulation system; or an electric operating mode, in which the thermal engine is off and the torque is generated only by the electric machine working as engine; or a combined operating mode, in which the torque is generated by both the thermal engine and by electric machine working as engine. Furthermore, in order to increase total energy efficiency during all steps of decelerating, the electric machine may be used as generator for a regenerative deceleration in which the kinetic energy possessed by the vehicle is partially converted into electricity, which is stored in the accumulation system, instead of being fully dissipated in friction in the brakes.

When the electric machine is disconnectable from the driving wheels, i.e. when the electric machine is mechanically connected to a primary gearbox shaft or is mechanically connected directly to a drive shaft of the thermal engine, the electric machine may be used to start the thermal engine itself, thus also performing the function of starter motor (as described, for example, in U.S. Pat. No. 5,337,848A1 and in patent application GB2335404A).

When the thermal engine is "cold", the thermal engine requires the application of a very high torque (indicatively even 2-4 times higher than the starting torque needed to start a "warm" thermal engine) to the drive shaft, because the lubricant oil inside the thermal engine is not very fluid and thus opposes a high mechanical resistance due to the low temperature. A traditional starter motor can apply a very high torque to the drive shaft of the thermal engine by virtue of a very high gear-down ratio (e.g. even 1:10) between the starter motor and the drive shaft; instead, the electric machine of a vehicle with hybrid propulsion is normally mechanically connected to the drive shaft of the thermal engine with a low gear-down ratio (often unitary, i.e. 1:1, and thus without any gear-down). Consequently, the electric machine of a vehicle with hybrid propulsion may not be capable of generating the very high starting torque needed to start the thermal engine when the thermal engine is "cold".

In order to solve the aforesaid problem, in patent application US2002117860A1 it is suggested to mechanically couple the electric machine to the drive shaft of the thermal engine with two different, automatically selectable transmission ratios: a first, more geared-down ratio is selected during a step of starting of the thermal engine, while for the remaining use of the electric machine a second, more direct ratio (i.e. less geared-down ratio) is selected. However, this solution is constructively complex because a servo controlled gearbox must be interposed between electric machine and drive shaft.

In order to solve the drawback described above, in patent applications WO2007131838A1, US2005155803A1, U.S. Pat. No. 6,354,974A1 and US2009017988A1 the electric machine is separated from the drive shaft of the thermal engine by a clutch; in order to start the thermal engine, the clutch is opened, the electric machine is rotated with "no load" and the clutch is closed with the electric machine rotating so as to also exploit the inertia (i.e. the kinetic energy) possessed by the electric machine to rotate the thermal engine. However, such "launched" starting methods may not be sufficient to start a sporty, high-performance thermal engine, which has a high displacement and a high number of cylinders. Furthermore, the "launched" starting method allows to apply a high starting torque to the drive shaft needed to start a "cold" thermal engine, but is redundant to start a "warm" thermal engine; consequently, when the thermal engine is "warm", the "launched" starting method may impose unnecessarily high mechanical stress on the transmission components and determine an unnecessary delay in starting the thermal engine related to the time needed to "idle" the electric machine.

It has been further suggested to start the thermal engine with the vehicle moving, i.e. when the driver requires forward vehicle motion the vehicle itself is initially moved only by the electric machine working as engine (thus solely in electric traction) and only later is the clutch which connects the drive shaft of the thermal engine to the electric machine and to the driving wheels closed to better exploit vehicle inertia to rotate, and thus start, the thermal engine.

By virtue of the vehicle inertia, the starting of the thermal engine is guaranteed in relatively rapid times; however, when the clutch which connects the drive shaft of the thermal engine to the driving wheels is closed, a reduction (or a cancellation or even an inversion) of the vehicle acceleration occurs due to the braking effect of the thermal engine; such a reduction of vehicle acceleration is very annoying because it is clearly perceived by the driver. It is worth noting that the driver does not intervene in any manner on the decision to start or stop the thermal engine: the only command decided by the user is to press the accelerator pedal and when the driver presses the accelerator pedal the vehicle is expected to accelerate uniformly and not to "suddenly" brake because an electronic control unit has autonomously decided to start the thermal engine. Furthermore, the braking effect of the thermal engine determines the onset of longitudinal oscillations, which are particularly annoying because they are clearly perceived and very uncomfortable.

Finally, during the starting of the thermal engine vibrations may be generated on the drive shaft, which are transmitted to the driving wheels determining further longitudinal oscillations of the vehicle. As previously mentioned, the longitudinal oscillations are particularly annoying because they are clearly perceived and very uncomfortable.

SUMMARY

Various examples provide a starting method of a thermal engine of a vehicle with hybrid propulsion, which starting method reduces or is free from the above-described drawbacks and is concurrently easy and cost-effective to implement.

According to some examples, a method for starting a thermal engine of a vehicle with hybrid propulsion is provided as claimed in the attached claims.

BRIEF DESCRIPTION OF THE DRAWINGS

The present invention will now be described with reference to the accompanying drawings, which illustrate a non-limitative embodiment thereof, in which.

DETAILED DESCRIPTION

Figure 1:
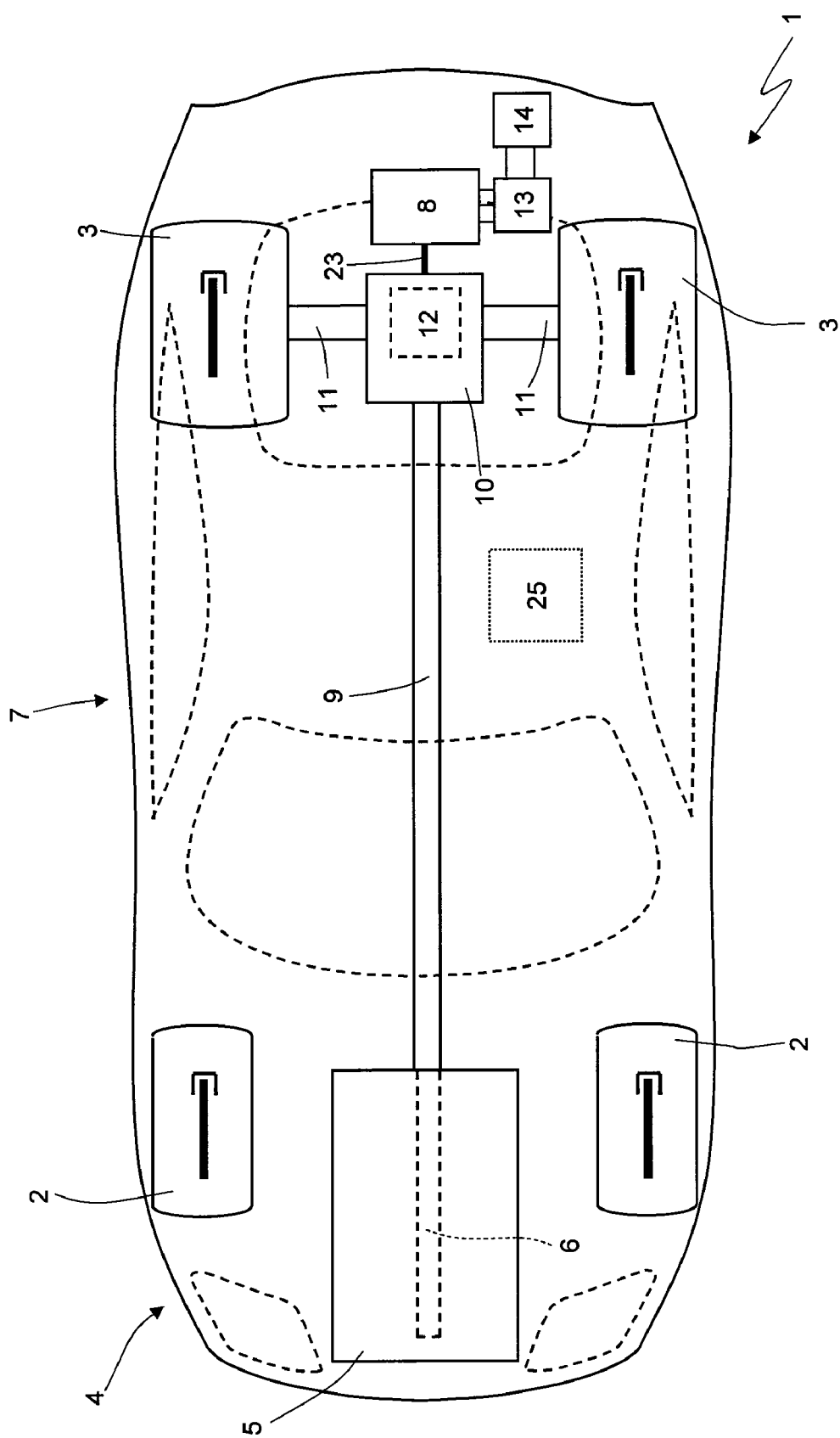
FIG. 1 is a diagrammatic view of a road vehicle with hybrid propulsion.

In FIG. 1, numeral 1 indicates as a whole a road vehicle with hybrid propulsion provided with two front wheels 2 and two rear driving wheels 3, which receive torque from a hybrid propulsion system 4.

The hybrid propulsion system 4 comprises an internal combustion engine 5, which is arranged in frontal position and is provided with a drive shaft 6, an automatic manual transmission 7 (commonly named "AMT"), which transmits the torque generated by the internal combustion engine 5 to the rear drive wheels 3, and a reversible electric machine 8 (i.e. an electric machine which can work either as electric engine, using electricity and generating mechanical torque, or as electric generator, using mechanical energy and generating electricity), which is mechanically connected to the transmission 7.

The transmission 7 comprises a transmission shaft 9, which on one end is angularly integral with the drive shaft 6, and on the other end is mechanically connected to a twin-clutch gearbox 10, which is arranged in rear position and transmits motion to the rear driving wheels 3 by means of two axles shafts 12, which receive motion from a differential 12. The reversible electric machine 8 is mechanically connected to the twin-clutch gearbox 10, as described in greater detail below, and is controlled by an electronic power converter 13 connected to an electric accumulation system 14, which is adapted to store electricity, and is provided with chemical batteries and/or supercapacitors.

Figure 2:
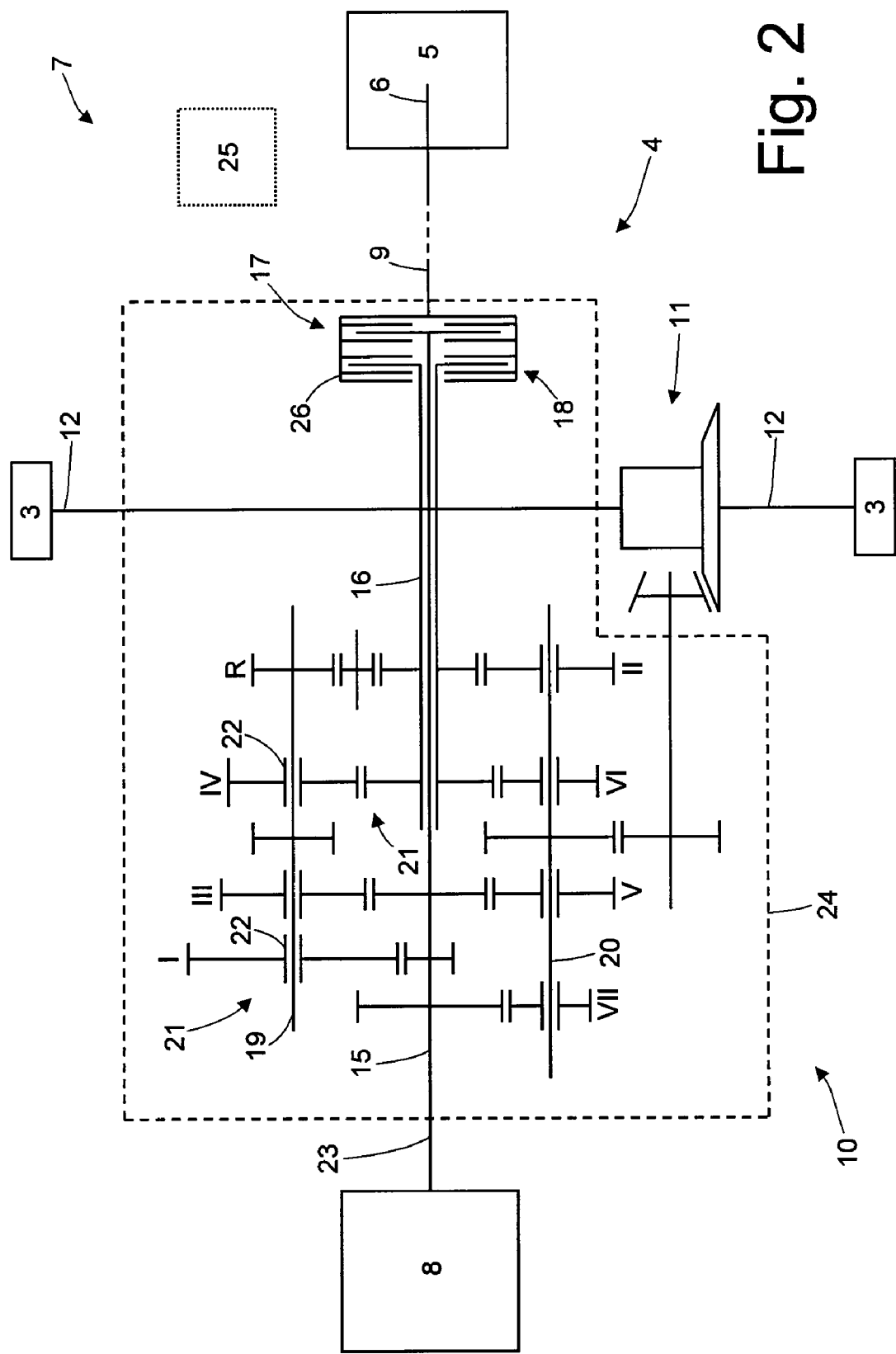
FIG. 2 is a diagrammatic view of a transmission of the road vehicle in FIG. 1.

As shown in FIG. 2, the twin-clutch gearbox 10 comprises two mutually coaxial, independent primary shafts 15 and 16, inserted within one another, and two coaxial clutches 17 and 18 arranged in series, each of which is adapted to connect a respective primary shaft 15 or 16 to the transmission shaft 9 (and thus to the drive shaft 6 of the thermal internal combustion engine 5). Furthermore, the twin-clutch gearbox 10 comprises two secondary shafts 19 and 20, which are both angularly integral with the input of the differential 11, which transmits motion to the rear driving wheels 3.

The twin-clutch gearbox 10 shown in the FIG. 2 has seven forward gears indicated by Roman numerals (first gear I, second gear II, third gear III, fourth gear IV, fifth gear V, sixth gear VI and seventh gear VII) and one reverse gear (indicated by the letter R). The primary shafts 15 and 16 are mechanically coupled to the secondary shafts 19 and 20 by means of a plurality of gear pairs 21, each of which defines a respective gear, and comprises a primary gear which is mounted on a primary shaft 15 or 16 and a secondary gear, which is mounted on a secondary shaft 19 or 20 and permanently meshes with the primary gear. In order to allow the correct operation of the twin-clutch gearbox 10, all the odd gears (first gear I, third gear III, fifth gear V, seventh gear VII) are coupled to a same primary shaft 15, while all the even gears (second gear II, fourth gear IV, and sixth gear VI) are coupled to the other primary shaft 16.

Each primary gear 8 is keyed onto a respective primary shaft 15 or 16 to rotate, again integrally, with the primary shaft 15 or 16 itself, and permanently meshes with the respective secondary gear; instead, each secondary gear is idly mounted on the respective secondary shaft 19 or 20. The twin-clutch gearbox 10 comprises a respective synchronizer 22 for each gear pair 21, which is mounted coaxially to respective secondary shaft 19 or 20, and is adapted to be actuated to engage the respective secondary gear 19 or 20 (i.e. to make the respective gear angularly integral with the secondary shaft 19 or 20).

The electric machine 8 has a drive shaft 23, which is permanently connected to the primary shaft 15 so as to rotate, again integrally, with the primary shaft 15 itself. According to some examples, starting from an existing twin-clutch gearbox casing 10 not initially designed for hybrid traction, the primary shaft 15 is elongated on the side opposite to the clutches 17 and 18 in order to protrude from a gearbox casing 24; therefore, outside the gearbox 24, the primary shaft 15 is made integral (e.g. by butt jointing) to the shaft 23 of the electric machine 8.

As shown in the appended figures, the vehicle 1 comprises a control unit 25, which controls or superintends the operation of the propulsion system 4, and thus the operation of the thermal engine 5, of the transmission 7 and of the electric machine 8. Among other things, the control unit 25 is connected to a temperature sensor which detects the temperature of a cooling liquid of the thermal engine 5.

Reference is made to patent application IT2008BO00594, which is incorporated herein by reference in its entirety, for a description of the operating mode of the electric machine 8.

Figure 3:
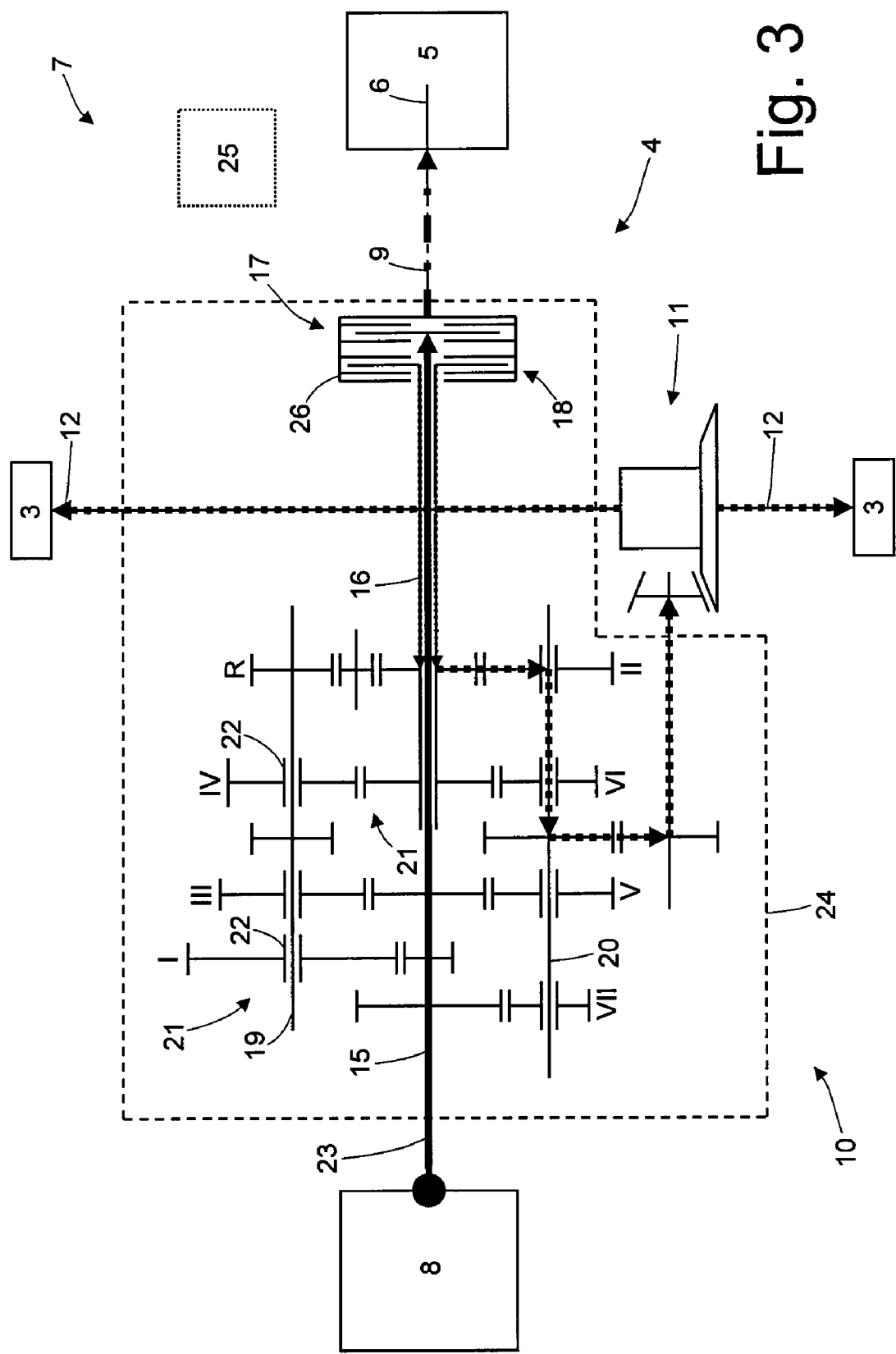
FIG. 3 is a diagrammatic view of the transmission in FIG. 2 showing the path of torque generated by a reversible electric machine working as engine during a starting of a thermal engine made, according to some examples.

The methods used by the control unit 25 to start the thermal engine 5 when the vehicle 1 is stationary are described with reference to FIG. 3.

It is worth noting that when the vehicle 1 is standing, the thermal engine 5 must be normally started following a request for movement by the driver (i.e. the driver presses the accelerator pedal when requesting movement); therefore, in order to satisfy the motion requirement by the driver as quickly as possible, torque must be transmitted to the driving wheels 3 as rapidly as possible.

In order to start the thermal engine 5 when the vehicle 1 is standing, the control unit 25 makes the electric machine 8 work as engine to generate the maximum possible torque; at the same time (or nearly at the same time, as described in greater detail below) the control unit 25 partially closes both clutches 17 and 18 so that both clutches 17 and 18 slip (i.e. work with a given relative slip between the two parts of each clutch 17 and 18) and the second gear II is engaged by making the corresponding synchronizer 22 connect the primary shaft 16 to the driving wheels 3 (obviously all the other gears are disengaged).

In this manner, the torque generated by the electric machine 8 (shown by a thick solid line in FIG. 3) is entirely transmitted by the clutch 17 to a basket 26 in common to the clutches 17 and 18; from the basket 26 in common to clutches 17 and 18 the torque generated by the electric machine 8 is divided partially towards the thermal engine 5 and partially towards the primary shaft 16, and thus towards the driving wheels 3. In FIG. 3, the part of torque addressed towards the thermal engine 5 is indicated by a thick dashed-and-dotted line, while the part of torque addressed towards the driving wheels 3 is indicated by a thick dashed line.

The part of the driving torque generated by the electric machine 8 which is addressed towards the thermal engine 5 turns the engine shaft 6 determining the ignition of the thermal engine 5 itself in known manner. Instead, the part of the torque generated by the electric machine 8 which is addressed towards the driving wheels 3 turns the driving wheels 3 themselves determining the running of the vehicle 1.

The distribution of the torque generated by the electric machine 8 between the thermal engine 5 and the driving wheels 3 is regulated by the degree of closure of the clutches 17 and 18; in other words, the degree of closure of the clutch 17 is regulated to regulate the part of torque addressed towards the thermal engine 5 (the more the clutch 17 is closed, the more driving torque generated by the electric machine 8 is addressed towards the thermal engine 5), and the degree of closing of the clutch 18 is regulated to regulate the part of torque addressed to the driving wheels 3 (the more the clutch 18 is closed, the higher is the part of torque generated by the electric machine 8 addressed to the driving wheels 3). It is apparent that the degree of closure of the clutch 17 is regulated to regulate the part of torque addressed to the thermal engine 5 according to the starting needs of the thermal engine 5 itself, while the degree of closure of the clutch 18 is regulated to regulate the part of torque addressed to the driving wheels 3 according to the motion requirements of the vehicle 1; the two regulation methods are not independent, because the available torque is limited by the performance of the electric machine 8, and thus an acceptable compromise must be found in every instant between the starting needs of the thermal engine 5 and the motion requirements of the vehicle 1.

With regards to the motion requirements of the vehicle 1, one need is to avoid sudden or even pulsating longitudinal acceleration variations of the vehicle 1, because this is extremely uncomfortable for the occupants of the vehicle 1.

As previously mentioned, both clutches 17 and 18 are partially closed so that both clutches 17 and 18 slip; in this manner, the rotation speed of the electric machine 8, the rotation speed of the thermal engine 5, and the rotation speed of the driving wheels 3 are independent from one another. Consequently, the electric machine 8 may turn at the rotation speed which allows the generation of the maximum possible mechanical power (typically the nominal rotation speed of the electric machine 8), because during this step all the available power is needed to start the thermal engine 5 rapidly and to accelerate the vehicle 1; in other words, the rotation speed of the electric machine 8 is independent from the rotation speed of the drive wheels 3 and the rotation speed of the drive shaft 6 of the thermal engine 5 and thus may maximize the generation of the mechanical power. Furthermore, the drive shaft 6 of the thermal engine 5 is free to follow an optimal progression of the angular speed compatible with the concerned inertias (which in the case of a fractioned thermal engine 5 split into 8, 10 or 12 cylinders are high because of the cylinder counterpressure). Finally, the driving wheels 3 of the vehicle 1 are free to impart the required acceleration compatibly with the concerned inertias to the vehicle 1.

It is worth noting that all the vibrations which are generated when the thermal engine 5 is starting are absorbed by the clutches 17 and 18 which slip, and thus are not in any manner transmitted by the driving wheels nor to the vehicle 1; in other words, a possible pulsating oscillation which is generated on the rotation speed of the drive clutch 6 of the thermal engine 5 stops in the clutches 17 and 18 which slip and reaches neither the electric machine 8, nor the driving wheels 3. This aspect is extremely important because it allows to guarantee a high comfort to occupants of the vehicle 1 during the starting of the thermal engine 5.

The above applies to the starting of the thermal engine 5 when the vehicle 1 is stationary and if the driver has selected forward movement (indeed, the second gear II, which is a forward gear, is engaged in the gearbox); if the driver selects reverse gear and the vehicle 1 is stationary, the starting methods described above remain substantially unchanged, with the sole exception that reverse R instead of second gear II is engaged in the gearbox 10.

When instead the vehicle 1 is already running in electric traction mode (i.e. the torque is supplied only by the electric machine 8), the starting methods described above remain substantially unchanged, with the sole exception that another gear more suitable for the advancement speed of the vehicle 1 could be engaged in the gearbox 10 instead of second gear II (e.g. fourth gear IV or sixth gear VI).

It is worth noting that during the starting of the thermal engine 5 described above the part of torque generated by the electric machine 8 which is addressed to the driving wheels 3 must necessarily pass through the primary shaft 16 (and thus necessarily through an even gear or reverse, which are coupled to the primary shaft 16), because the primary shaft 15 permanently integral with the shaft 23 of the electric machine 8 must remain independent from the driving wheels 3.

During the starting of the thermal engine 5, the electric machine 8 may be temporarily overloaded with respect to the nominal performance to have the maximum possible power available; in other words, the intensity of the electric current supplied to the electric machine 8 is increased to overload the electric machine 8 by feeding the electric machine 8 itself with an electric current having an intensity which is higher than nominal intensity (i.e. than the maximum intensity which can be sustained in continued manner without damage) in order to have the electric machine 8 generating a mechanical power higher than the nominal mechanical power.

According to a possible embodiment, before partially closing the clutches 17 and 18 the electric machine 8 is accelerated with no load to reach a required launch rotation speed; only when the electric machine 8 has reached the required launch rotation speed the clutches 17 and 18 are partially closed, as described above. In this manner, the torque (higher than nominal torque) generated by the electric machine 8 is entirely used to rotate the drive shaft 6 of the thermal engine 5, because the electric machine 8 (along with the parts of the transmission 7 angularly integral with the electric machine 8) was previously made to rotate. Furthermore, in this manner, part of the kinetic energy possessed by the electric machine 8 (and by parts of the transmission 7 angularly integral with the electric machine 8) can be transferred to the drive shaft 6 of the thermal engine 5 and/or to the driving wheels 3; in other words, the electric machine 8 undergoes a deceleration which determines a transfer of part of the kinetic energy possessed by the electric machine 8 (and by the parts of the transmission 7 integrally angular with the electric machine 8) to the drive shaft 6 of the thermal engine 5 and/or to the driving wheels 3.

Before starting to start the thermal engine 5, the control unit 25 determines the temperature of the thermal engine 5 by reading the measurement provided by the temperature sensor of the cooling liquid of the thermal engine 5. Thus, the control unit 25 determines the overload of the electric machine 8 by determining the increased intensity of the electric current fed to the electric machine 8 with respect to nominal intensity according to the temperature of the thermal engine 5; in particular, the increase of the intensity of the electric current fed to the electric machine 8 with respect to nominal intensity is inversely proportional to the temperature of the thermal engine 5, thus the lower the temperature of the thermal engine 5, the higher the increase of intensity of the electric current fed to the electric machine 8 with respect to the nominal intensity, and vice versa. In other words, the lower the temperature of the thermal engine 5, the higher the starting torque to be applied to the drive shaft 6 of the thermal engine 5, and thus the higher the overload of the electric machine 8.

Furthermore, before starting to start the thermal engine 5, the control unit 25 determines the launch rotation speed of the electric machine 8 (i.e. the rotation speed of the electric machine 8 in the closing instant of the clutch 15) according to the temperature of the thermal engine 5; in particular, the launch rotation speed is inversely proportional to the temperature of the thermal engine 5, and therefore the lower the temperature of the thermal engine 5, the higher the launch rotation speed. In other words, the lower the temperature of the thermal engine 5, the higher the starting torque to be applied to the drive shaft 6 of the thermal engine 5, and thus the higher the kinetic energy which must be transmitted from the electric machine 8 (and from the parts of the transmission 7 angularly integral with the electric machine 8) to the thermal engine 5 (i.e. the higher the launch rotation speed).

From the above, it is apparent that the control unit 25 regulates both the launch rotation speed of the electric machine 8 when the clutch 15 is closed, and the overload entity of the electric machine 8 while/after closing the clutch 15 according to the temperature of the thermal engine 5 (i.e. the temperature of the cooling liquid of the thermal engine 5); in this manner, when the thermal engine 5 is "cold", i.e. the torque required for starting is higher due to the hydraulic resistance generated by the lubricant, the launch rotation speed of the electric machine 8 when the clutch is closed can be increased and/or the overload intensity of the electric machine 8 can be increased.

According to some embodiments, before starting the thermal engine 5 the control unit 25 also determines the temperature of the electric machine 8, and thus determines the intensity of the electric current fed to the electric machine 8 with respect to the nominal intensity also according to the temperature of the electric machine 8. In other words, according to the temperature of the electric machine 8, the control unit 25 may limit the electric machine 8 overload (e.g., by compensating the overload limitation of the electric machine 8 with a corresponding increase of the launch rotation speed) to prevent subjecting the electric machine 8 to excessive overheating, which could damage or overstress the electric insulation of the electric machine 8 itself. Consequently, beyond given threshold, the higher the temperature of the electric machine 8, the lower the increase of the intensity of the electric current fed to the electric machine 8 with respect to nominal intensity.

If the cooling circuit of the electric machine 8 is in common with the cooling circuit of the thermal engine 5, the temperature of the electric machine 8 is estimated according to the temperature of the cooling liquid of the thermal engine 5 supplied by the temperature sensor. If the cooling circuit of the electric machine 8 is independent from the cooling circuit of the thermal engine 5, the temperature of the electric machine 8 is independently estimated by determining the temperature of the thermal engine 5 using a specific temperature sensor, or the temperature of the electric machine 8 is indirectly estimated by estimating an electric resistance of at least one stator winding of the electric machine 8 according to the voltage applied to the terminals of the stator winding and to the electric current which crosses the terminals of the stator winding, and thus estimating the temperature of the electric machine 8 according to the electric resistance of the stator winding of the electric machine 8.

It is worth noting that if upon starting the thermal engine 5 is "warm", the overload of the electric machine 8 and/or the launch rotation speed could be cancelled; the choice of reducing/cancelling the overload of the electric machine 8 or the launch rotation speed depends on whether to privilege reduction of stress on the electric machine 8 with respect to starting rapidity.

The above described starting method of the thermal engine 5 has many advantages.

Firstly, the above described method for starting the thermal engine 5 allows to rapidly and effectively start the thermal engine 5 in all conditions (i.e. both when the thermal engine 5 is "cold" and when the thermal engine 5 is "warm") without excessively stressing (i.e. stressing more than necessary) the components of the transmission 7, and in particular the electric machine 8.

Furthermore, the driver and the other occupants of the vehicle 1 are not aware of the starting of the thermal engine 5 and do not experience any negative consequence (such as sudden or unexpected braking of the vehicle and/or the onset of longitudinal oscillations) during the starting of the thermal engine 5. Therefore, from the point of view of the driver and the other occupants of the vehicle 1 the starting of the thermal engine 5 is extremely comfortable.

Finally, the above-described method for starting the thermal engine 5 is simple and cost-effective to be implemented also in an existing vehicle with hybrid propulsion because it does not require the installation of additional physical components with respect to those normally present and does not engage a considerable calculation power (therefore does not require an increase of power of the control unit 25).

The invention claimed is:

1. Starting method of an internal combustion thermal engine of a vehicle with hybrid propulsion provided with a transmission comprising a twin-clutch gearbox provided with two primary shafts independent from one another and inserted one inside the other, with two coaxial clutches arranged in series, each of which is for connecting a respective primary shaft to a drive shaft of the thermal engine, with at least one secondary shaft meshing with driving wheels, with a plurality of gear pairs, each of which defines a respective gear and comprises a primary gear mounted on a primary shaft and a secondary gear which is mounted on a secondary shaft and meshes with the primary gear, and a reversible electric machine provided with a shaft which is mechanically connected to a first primary shaft, the method comprising:

working the electric machine as an engine for producing a torque;

closing a first clutch connected to the first primary shaft in order to transmit the torque generated by the electric machine to the drive shaft of the thermal engine;

closing partially the first clutch, so that the first clutch slips to allow for a rotation speed of the electric machine that is independent from a rotation speed of the drive shaft of the thermal engine;

engaging a gear coupled to a second primary shaft in order to connect mechanically the second primary shaft to the secondary shaft and to the driving wheels; and closing partially a second clutch connected to the second primary shaft so that the second clutch slips and part of the torque generated by the electric machine is transmitted to the driving wheels allowing for the rotation speed of the electric machine to be independent from the rotation speed of the driving wheels.

2. Starting method according to claim 1 and comprising the step of regulating a degree of closure of the first clutch in order to regulate a part of torque addressed towards the thermal engine in association with the starting needs of the thermal engine.

3. Starting method according to claim 1 and comprising the step of regulating a degree of closure of the second clutch in order to regulate a part of torque addressed towards the driving wheels associated with the motion requirements of the vehicle.

4. Starting method according to claim 1 and comprising the step of controlling the electric machine in order to generate the highest possible mechanical power.

5. Starting method according to claim 1 and comprising the step of overloading the electric machine during and after the closure of the first clutch by feeding the electric machine with an electric current having an intensity which is higher than a nominal intensity in order to make electric machine generate a torque which is higher than a nominal torque.

6. Starting method according to claim 5 and comprising the steps of:
determining a temperature of the thermal engine; and
determining an overload of the electric machine by determining an intensity increase of the electric current fed to the electric machine with respect to a nominal intensity associated with the temperature of the thermal engine.

7. Starting method according to claim 6 and comprising the steps of:
determining a temperature of the electric machine; and
determining the overload of the electric machine by determining the intensity increase of the electric current fed to the electric machine with respect to the nominal intensity also associated with the temperature of the electric machine.

8. Starting method according to claim 1 and comprising the steps of:
rotating the electric machine by using the electric machine as an engine before closing the first clutch; and
closing the first clutch when the electric machine reaches a launch rotation speed.

9. Starting method according to claim 8 and comprising the steps of:
determining the temperature of the thermal engine; and
determining the launch speed rotation according to the temperature of thermal engine.

10. Starting method according to claim 1 and comprising the step of overloading the electric machine during or after the closure of the first clutch by feeding the electric machine with an electric current having an intensity which is higher than the nominal intensity in order to make electric machine generate a torque which is higher than the nominal torque.

11. Starting method according to claim 1, wherein closing partially the first clutch includes closing only partially the first clutch.

12. Starting method according to claim 1, wherein closing partially the second clutch includes closing only partially the second clutch.

* * * * *